Patented Oct. 18, 1927.

1,646,149

UNITED STATES PATENT OFFICE.

PAUL R. JONES, OF PORTERVILLE, CALIFORNIA, ASSIGNOR TO BALFOUR, GUTHRIE & CO., A COPARTNERSHIP COMPOSED OF BALFOUR DUNLOP ADAMSON, GERALD HAYNE GUTHRIE WILLIAMSON, CHARLES CLEMENT GUTHRIE, AND WALTER JOHN BURNS, ALL OF SAN FRANCISCO, CALIFORNIA; SIR ARCHIBALD WILLIAMSON, ALEXANDER BALFOUR WILLIAMSON, JOHN CRAIK, AND JOHN LAWSON, ALL OF LONDON, ENGLAND; THOMAS JAMES WHITSON, OF LIVERPOOL, ENGLAND; AND ALEXANDER BAILLIE, OF SEATTLE, WASHINGTON.

INSECTICIDE EMULSION.

No Drawing. Application filed August 20, 1925. Serial No. 51,511.

This invention relates to insecticides and particularly to a new oil emulsion composition especially adapted to be used in spraying citrus fruit trees for the killing of insects and scale. It is well known that various oil sprays have been used for years for this purpose, and furthermore that such sprays as have been effective to kill the insects have been made up by mixing the heavier type of lubricating oils with various emulsifiers such as cresol soap or strongly alkali soaps, so that, when used at an effective strength, damage, such as leaf drop, fruit spotting, etc., has resulted.

Other oil sprays have recently appeared on the market and have been used quite extensively. It is claimed for one of these sprays that it is a one hundred per cent safe oil emusion made from a non-volatile oil of Nujol or medicinal oil type. This spray has been particularly advertised as not being injurious to the tenderest plant or fruit or foliage under any condition of heat and cold. The first use of this improved spray had quite apparently substantiated some of the claims made since its use, for the first year was not attended with the ill effects of the oil sprays formerly used. The results accomplished in scale kill were, however, very erratic, sometimes doing very good work in the summer at two, three and four per cent strengths, but failing utterly in the fall at eight, ten and twelve per cent strengths. However, after two years serious faults began to appear. Generally speaking, these bad results were not immediate, but of an accumulative and unusual nature. Some growers have complained that their trees did not set as heavy crops the year following the spraying with this product. Other orange growers complained that a brown spot formed at the bottom of the oranges, thus making the fruit less attractive and less salable. The greatest damage, however, resulted to oranges and lemons in the following manner.

Early navel oranges are ordinarily brought to sweat rooms where they are treated to improve their color. This improved color is ordinarily taken on very quickly in this process whereby the fruit reaches an early market. The fruit which had been sprayed with this new composition failed to take on the improved color in the usual manner and some did not respond for several weeks. Consequently, the growers did not reach an early market and had a large loss in many cases through failure to secure early prices. On lemons this was even more serious, as all lemons are picked green and not tree ripe and are sweated for color. On fruit sprayed with this product some lemons have even been dumped out as culls, since they did not take any color even after a long period of sweating. Another serious effect of this spray has been that it does not spread well, but has a tendency to bounce off the leaves, thereby causing a poor kill on scale and a resultant high dosage of material being used per tree.

It is quite apparent, upon analysis of this spray composition, that it consists of an oil of the Nujol type, such as crystal oronite, mixed with two to three parts of kerosene and emulsified by two or more non-soap emulsifiers which are probably gums well known to the trade. The product is put out as a very thick paste running seventy-five per cent oil, the remainder emulsifier and water. It is put up in barrels or drums and the fruit grower uses from two to thirteen per cent for his various pests, namely, from two to thirteen gallons per one hundred gallon tank of water. Crystal oronite is distinctly a lubricating oil which is refined and treated and filtered thoroughly until it has no taste and color and is a pure white oil running from about 110 to 125 viscosity, and is about 29.6° B. in gravity.

This oil might be satisfactory for certain purposes were it not for its high cost. The main objections thereto are its high cost, its lack of penetration and its too lasting effect. It has been attempted to overcome these objections by diluting with kerosene, but as above outlined, such attempt has not been attended with much success.

Because of the damage resulting from the oil sprays heretofore used, and particularly the damage resulting from the high viscosity of the said recently developed composition, its poor spread, high cost, etc., I have, through considerable expense and development, produced an improved spray composition which is more effective in performing the desired functions, can be applied without injury to the trees or fruit, and can be manufactured considerably cheaper than the sprays now in use. In my new process and product I employ a one type oil of the kerosene group, such as mineral seal oil or transformer oil, as hereinafter described, whereby I secure a product which can be cheaply manufactured and is more effective without having the objections above stated. It is the primary object of my invention to provide such an improved product for the purpose stated.

From the above analysis, it is apparent that a spraying composition, to be effective and yet to avoid any serious after effects, must have certain characteristics in its composition and action. After considerable study and experimenting on the subject, I have arrived at the following conclusions: Such a spray should be able to quickly penetrate the leaves and fruit in a manner to reach insects and scale, should not leave a viscous residue on the fruit long after its object has been accomplished and should be cheap. It is an object of my invention to provide an improved spraying composition embodying these features.

In my improved process, instead of using a mixed oil such as kerosene and oronite, I use a one-type oil of the kerosene group, such as mineral seal oil or No. 1 transformer oil substantially as follows: specific gravity .8883, or Baumé 28.50 at 60° Fahrenheit, flash 290°, viscosity 54° Saybolt at 100° Fahrenheit, color No. 1. It should be understood that mineral seal oil is a distinct cut; in other words, a sort of kerosene with lubricating qualities but belonging to the kerosene group. It is obtained from the residue left after taking out the kerosene cuts from the crude oil. This residue contains a fatty matter or lubricating material that is left in the "tailings", and it is retreated and redistilled thoroughly to produce the mineral seal oil. This oil is nearly white with a slight straw color, smells very much like kerosene and looks like it but has a distinct lubricating feel. It is a very mild oil, and while it has the penetration of the kerosene, it has twice the viscosity of some of the distillates with a gravity 4 to 6 points lower.

The mineral seal oil cut can be close, which would leave a high gravity mineral seal, or it can be quite long where more lubricating properties are desired. This latter is believed to be preferable, since the transformer oil made therefrom has substantially the above stated characteristics. This transformer oil is made from the mineral seal oil group or kerosene family, but it is carried further and refined more; that is, receives more acid and alkali treatments, and finally is filtered through clay to give it high insulating properties and take out the least bit of foreign matter or unsaturated hydrocarbon oil.

Crystal oronite on the other hand is distinctly a lubricating oil, and all oils of this type are of the Nujol type and come out of a distinct lubricating cut, such as neutral stock or ordinary red or auto oils. Such a highly refined oil is considerably more expensive and does not have the desired spraying composition properties of the cheaper grade oil I employ. To compensate for this deficiency kerosene oil has been added thereto as above described. Therefore, in sprays of this type heretofore manufactured, it has been thought necessary to use two highly refined expensive oils. In my improved process I use a very cheap one type oil which I have discovered serves the purpose intended even more satisfactorily than the more expensive oils heretofore used.

For emulsifying, I use four different non-soap emulsifiers, namely calcium caseinate, dextrine (either yellow or white), colloidal clay (known under the trade-name as bentonite or wilkonite) and black lignin liquid (a by-product from the paper pulp factories of alkaline nature) and a small amount of corn oil soap. Good emulsions can be made using any two or three of the various mentioned emulsifiers, but all of them used together give a better product which has smoothness, handles easier in the field, dilutes readily, stays emulsified and spreads better than trying to use one or two of them.

Calcium caseinate has a tendency to thicken up an emulsion, whereas the small amount of soap used has a tendency to thin the emulsion, so that one can, by increasing the one and lowering the other, make emulsions very thick or very thin, which enables one to please the trade in the different fruit sections.

Following is defined in detail the ingredients and a preferred method of manufacturing my improved spraying composition which is known to the trade as "triona": two hundred gallons of transformer oil running approximately specific gravity .8883, or Baumé 28.50 at 60° Fahrenheit, flash 290°, viscosity 54° Saybolt at 100° Fahrenheit, color No. 1; sixty-six gallons of water, making a total of two hundred sixty-six gallons.

In portions of the water are dissolved in separate containers nine and one-half quarts of lignin liquor, and then twelve pounds of yellow dextrine, which are added to the diluted lignin liquor. Then nineteen pounds of white colloidal clay are dissolved in other water and also one to one and one-half pounds of calcium caseinate; then finally two pounds of corn oil soap. The lignin liquor containing the dissolved dextrine is placed in an agitator, then the diluted clay, and finally the caseinate and dissolved corn oil soap, which makes approximately a total of sixty-six gallons of water containing the dissolved emulsifiers. The agitator is then started up with the paddles revolving and two-hundred gallons of transformer oil added. This is then run through pumps or through an emulsifying machine, known as the Premier colloid mill. This machine works at a very high rate of speed, namely, about four thousand revolutions per minute, and is driven with a thirty-five horse-power motor. The emulsion is forced through the mill at a very close clearance of ten thousandths or fifteen thousandths of an inch, at the same time receiving an electrical charge, making an emulsion which is very finely divided. The Premier mill makes "triona" by a continuous process; that is, turns out this product continually if fed continually, whereas machines of the pumping type turn out the "triona" by the batch process.

This product is then diluted in the field, usually from one to three per cent, and sometimes as high as four per cent. That is, one to four gallons of the product is used in making one hundred gallons of spraying solution.

The above formula makes an oil emulsion running seventy-five per cent oil by volume with an unusually low emulsifier content from a percentage basis. This product can be reduced to a sixty or sixty-five per cent oil content, or even raised up to about eighty per cent oil content, and as mentioned before, can be thickened or thinned by adjusting the corn oil soap and calcium caseinate.

Since the main ingredients (preferably mineral seal oil or transformer oil) used in my process are comparatively cheap, my improved spraying composition can be made very cheaply, probably for one-half of the cost of the composition using a mixture of kerosene and crystal oronite. Also, in use, this oil is more penetrating and does not leave a viscous residue on the fruit an objectionably long time after spraying. Furthermore, kerosene and crystal oronite, as mixed together in the manner above stated, run about 30° B. gravity, and have to be used at a high dosage of eight to twelve per cent to kill scale in the half grown and three-fourths grown stages. Mineral seal oil, being of a gravity about 29° B., but with much less viscosity, penetrates better and cleans the scale readily when using the emulsion at two, two and one-half, and three per cent strengths, and will kill as well at one and one-half per cent strengths as the crystal oronite spray at three to four per cent strengths.

Having thus described my invention, what I claim and desire to secure by Letters Patent is:

1. A spraying composition consisting of a one type oil of the kerosene group emulsified with calcium caseinate, dextrine, and colloidal clay.

2. A spraying composition consisting of a one type oil of the kerosene group emulsified with calcium caseinate, dextrine, colloidal clay, lignin liquor, and corn oil soap.

3. An improved oil spraying emulsion consisting of a one type oil of the kerosene group and an emulsifying agent consisting of calcium caseinate, white colloidal clay and dextrine.

4. The process of producing an improved oil spraying emulsion consisting of dissolving the following ingredients in approximately sixty-six gallons of water in approximately the quantities stated: nine and one-half quarts lignin liquor, twelve pounds dextrine, nineteen pounds white colloidal clay, one to one and one-half pounds calcium caseinate, two pounds corn oil soap, agitating the same and mixing therewith two hundred gallons of transformer oil.

5. A spraying composition consisting of a one type oil of the kerosene group emulsified with an emulsifier, the composition being approximately 60 to 75 percent oil and the remainder water and emulsifier consisting of caseinate, dextrine, and mineral emulsifier.

6. A spraying composition consisting of a one type oil of the kerosene group emulsified with an emulsifier, the composition being approximately 60 to 75 percent oil and the remainder water and emulsifier consisting of caseinate, dextrine and colloidal clay.

7. An improved oil spraying emulsion consisting of mineral seal oil and an emulsifying mixture of caseinate, dextrine and mineral emulsifier.

8. An improved oil spraying emulsion consisting of mineral seal oil and an emulsifying mixture of caseinate, dextrine and colloidal clay.

9. The process of producing an improved oil spraying emulsion consisting of dissolving in water the following ingredients, lignin liquor, dextrine, white colloidal clay, calcium caseinate, and corn oil soap and agitating the same and mixing therewith transformer oil.

10. The process of producing an improved oil spraying emulsion consisting of dissolving in water the following ingredients, lignin liquor, dextrine, white colloidal clay, calicum caseinate and transformer oil, and mixing the same to a finely divided state by pumping it through a close clearance.

PAUL R. JONES.